(12) United States Patent
Lim et al.

(10) Patent No.: US 12,221,022 B2
(45) Date of Patent: Feb. 11, 2025

(54) DUCT DOCKING DEVICE FOR VENTILATION SEAT OF VEHICLE

(71) Applicants: Hyundai Motor Company, Seoul (KR); Kia Corporation, Seoul (KR); Hyundai Transys Inc., Chungcheongnam-do (KR)

(72) Inventors: Deok Soo Lim, Gyeonggi-do (KR); Sang Hark Lee, Incheon (KR); Sang Soo Lee, Gyeonggi-do (KR); Jung Sang You, Gyeonggi-do (KR); Sang Do Park, Gyeonggi-do (KR); Chan Ho Jung, Gyeonggi-do (KR); Gun Chu Park, Gyeonggi-do (KR); Gi Tae Jo, Gyeonggi-do (KR); Jin Sik Kim, Gyeonggi-do (KR); Hee Dong Yoon, Gyeonggi-do (KR); Ho Sub Lim, Gyeonggi-do (KR); Jae Hyun Park, Gyeonggi-do (KR)

(73) Assignees: Hyundai Motor Company, Seoul (KR); Kia Corporation, Seoul (KR); Hyundai Transys Inc., Chungcheongnam-do (KR)

( * ) Notice: Subject to any disclaimer, the term of this patent is extended or adjusted under 35 U.S.C. 154(b) by 162 days.

(21) Appl. No.: 18/085,969

(22) Filed: Dec. 21, 2022

(65) Prior Publication Data
US 2024/0067065 A1     Feb. 29, 2024

(30) Foreign Application Priority Data

Aug. 26, 2022   (KR) .................. 10-2022-0107268

(51) Int. Cl.
*B60N 2/56*     (2006.01)
*B60N 2/22*     (2006.01)

(52) U.S. Cl.
CPC .................. *B60N 2/5657* (2013.01)

(58) Field of Classification Search
CPC ... B60N 2/5657; B60N 2/5635; B60N 2/5628
See application file for complete search history.

(56) References Cited

U.S. PATENT DOCUMENTS 5,572,937 A * 11/1996 Tegtmeier ............ F16L 51/024
                                                          110/298
6,179,706 B1 * 1/2001 Yoshinori ............ B60N 2/5657
                                                          297/180.14

(Continued)

FOREIGN PATENT DOCUMENTS

CN      111559223 B     3/2022
KR      101208756 B1    12/2012

(Continued)

*Primary Examiner* — Shin H Kim
(74) *Attorney, Agent, or Firm* — Fox Rothschild LLP

(57) ABSTRACT

Provided is a duct docking device for a ventilation seat of a vehicle. The duct docking device enables air to be easily blown to a seatback and a seat cushion with a passenger in a seat using only one blower by enabling a seatback duct mounted at the seatback and a seat cushion duct mounted at the seat cushion to be hermetically docked through a connector duct, etc. at an unfolded position of the seatback in which a passenger can sit, and by enabling the seatback duct mounted at the seatback and the seat cushion duct mounted at the seat cushion to be separated from each other at a folded position of the seatback in consideration of that there is no passenger in the seat.

18 Claims, 12 Drawing Sheets

(56) References Cited

U.S. PATENT DOCUMENTS

| | | |
|---|---|---|
| 10,981,476 B2 * | 4/2021 | Kim .......................... B60N 2/16 |
| 11,279,272 B2 | 3/2022 | Hoshi et al. |
| 11,325,510 B2 * | 5/2022 | Arata ..................... B60N 2/565 |
| 2018/0134193 A1 * | 5/2018 | Yang .................... B60N 2/5642 |
| 2019/0092197 A1 * | 3/2019 | Arata ....................... B60N 2/22 |
| 2020/0031258 A1 * | 1/2020 | Kim ..................... B60N 2/5642 |
| 2021/0101509 A1 * | 4/2021 | Hoshi .................. B60N 2/5628 |
| 2022/0049907 A1 * | 2/2022 | Tournois ................. F28F 9/002 |
| 2024/0067065 A1 * | 2/2024 | Lim ......................... B60N 2/22 |

FOREIGN PATENT DOCUMENTS

| | | |
|---|---|---|
| KR | 101745139 B1 | 6/2017 |
| WO | 2004/020231 A1 | 3/2004 |

* cited by examiner

- RELATED ART -

- RELATED ART -

- RELATED ART -

DUCT DOCKING DEVICE FOR VENTILATION SEAT OF VEHICLE

CROSS REFERENCE TO RELATED APPLICATION

The present application claims under 35 U.S.C. § 119(a) the benefit of Korean Patent Application No. 10-2022-0107268, filed Aug. 26, 2022, the entire contents of which is incorporated herein for all purposes by this reference.

BACKGROUND

Technical Field

The present disclosure relates to a duct docking device for a ventilation seat of a vehicle and, more particularly, to a duct docking device for a ventilation seat of a vehicle, the duct docking device enabling ducts of a ventilation seat to be docked at an unfolded position of a seatback, etc., and to be separated at a folded position of the seat back.

Background

An automotive ventilation seat, which is a kind of convenience device, enables air supplied by a blower to be sent to air discharge holes of a seat cushion and a seatback through ducts, whereby heat and humidity are quickly removed at the portions corresponding to the buttocks and the back of a passenger sitting in the seat, thereby being able to provide cool and pleasant feeling when sitting.

To this end, a blower that blows cold air, ducts that are air channels for transmitting air blown from the blower to air discharge holes of a seat cushion and a seatback, etc. are mounted in the ventilation seat.

FIGS. 1A and 1B of the accompanying drawings are schematic view showing a ventilation seat in the related art.

As shown in FIGS. 1A and 1B, the ventilation seat of the related art includes a blower 3 mounted on the bottom of a seat cushion 1 to distribute and blow air, a first duct 4-1 connected between a first discharge port of the blower 3 and the seat cushion 1, and a second duct 4-2 connected between a second discharge port of the blower 3 and a seatback 2, in which a corrugated tube is connected to a partial section of the second duct 4-2 in consideration of the rotation path of the seatback 2.

However, when the seatback 2 is folded, as shown in FIG. 1B, the second duct 4-2 can be extended by the corrugated tube 4-3, but there is a problem that the second duct 4-2 including the corrugated tube 4-3 may be exposed to the outside and damaged by interference with surrounding parts or an external force.

Further, when the blower 3 and the second duct 4-2 cannot be connected for folding of the seatback 2, as shown in FIG. 2, it is required to additionally mount a blower 3 for blowing air at the seatback 2 other than the blower 3 mounted at the seat cushion 1, so there is a problem that the weight and the manufacturing cost are increased due to addition of the blower.

SUMMARY OF THE DISCLOSURE

The present disclosure has been made in an effort to solve the general problems of the related art described above and an objective of the present disclosure is to provide a duct docking device for a ventilation seat of a vehicle, the duct docking device enabling air to be easily blown to a seatback and a seat cushion with a passenger in a seat using only one blower by enabling a seatback duct mounted at the seatback and a seat cushion duct mounted at the seat cushion to be hermetically docked through a connector duct, etc. at an unfolded position of the seatback in which a passenger can sit, and by enabling the seatback duct mounted at the seatback and the seat cushion duct mounted at the seat cushion to be separated from each other at a folded position of the seatback in consideration of that there is no passenger in the seat.

In order to achieve the objectives, the present disclosure, as an embodiment, provides a duct docking device for a ventilation seat of a vehicle, the duct docking device including: a seatback duct mounted on a seatback frame; a blower mounted on a seat cushion frame; a seat cushion duct mounted on the seat cushion frame and connected to a first discharge port of the blower; and a connector duct disposed on the seat cushion frame, connected to a second discharge port of the blower, and communicably docked to the seatback duct or separated from the seatback duct, depending on a rotation position of the seatback frame.

According to an embodiment of the present disclosure, when the seatback frame is at an unfolded position, an inlet of the seatback duct may be communicably docked to an outlet of the connector duct.

According to an embodiment of the present disclosure, when the seatback frame is at a folded position, an inlet of the seatback duct may be separated from an outlet of the connector duct.

According to an embodiment of the present disclosure, an inside cover having a communicating hole for communicating between the seatback duct and the connector duct when the seatback frame is positioned at a rotated position less than a predetermined angle other than an unfolded position may be further mounted on the seat cushion frame.

According to an embodiment of the present disclosure, an outlet of the connector duct may be coupled to the communicating hole from an outer surface of the inside cover, and an inlet of the seatback duct may be in close contact with an inner surface of the inside cover communicably to the communicating hole.

According to an embodiment of the present disclosure, an area of the inlet of the seatback duct that is in close contact with the inner surface of the inside cover may be smaller than an area of the inside cover and larger than an area of the outlet of the connector duct.

According to an embodiment of the present disclosure, a sealing plate configured to maintain a hermetic state may be attached to an edge of an inlet of the seatback duct.

In order to achieve the objectives, the present disclosure, as another embodiment, provides a duct docking device for a ventilation seat of a vehicle, the duct docking device including: a seatback foam mounted on a seatback frame; a seatback duct mounted on the seatback frame and having an inlet disposed to make the same plane with a side of the seatback foam; a blower mounted on a seat cushion frame; a seat cushion duct mounted on the seat cushion frame and connected to a first discharge port of the blower; and a connector duct disposed on the seat cushion frame, connected to a second discharge port of the blower, and communicably docked to the seatback duct in close contact with the side of the seat foam or separated from the seatback duct, depending on a rotation position of the seatback frame.

According to another embodiment of the present disclosure, an area of an outlet of the connector duct that is in close contact with the side of the seatback foam is smaller than an area of the side of the seatback foam and larger than an area of an inlet of the seatback duct.

In order to achieve the objectives, the present disclosure, as another embodiment, provides a duct docking device for a ventilation seat of a vehicle, the duct docking device including: a seat cushion duct mounted on a seat cushion frame; a blower mounted on a seatback frame; a seatback duct mounted on the seatback frame and connected to a first discharge port of the blower; and a connector duct connected to a second discharge port of the blower, and communicably docked to the seat cushion duct or separated from the seat cushion duct, depending on a rotation position of the seatback frame.

According to another embodiment of the present disclosure, when the seatback frame is at an unfolded position, an outlet of the connector duct may be communicably docked to an inlet of the seat cushion duct.

According to another embodiment of the present disclosure, when the seatback frame is at a folded position, an outlet of the connector duct may be separated from an inlet of the seat cushion duct.

According to an embodiment of the present disclosure, an inside cover having a communicating hole for communicating between the connector duct and the seat cushion duct when the seatback frame is positioned at a rotated position less than a predetermined angle other than an unfolded position may be further mounted on the seat cushion frame.

According to an embodiment of the present disclosure, an inlet of the seat cushion duct may be coupled to the communicating hole from an outer surface of the inside cover, and an outlet of the connector duct may be in close contact with an inner surface of the inside cover communicably to the communicating hole.

According to an embodiment of the present disclosure, an area of the outlet of the connector duct that is in close contact with the inner surface of the inside cover may be smaller than an area of the inside cover and larger than an area of the inlet of the seat cushion duct.

According to an embodiment of the present disclosure, a sealing plate configured to maintain a hermetic state may be attached to an edge of an outlet of the connector duct.

The present disclosure provides the following effects through the objectives described above.

First, when a seatback is at an unfolded position in which a passenger can sit, a seatback duct mounted in the seatback and a seat cushion duct mounted in a seat cushion are hermetically docked through a connector duct, etc., whereby it is possible to easily blow air to the seat back and the seat cushion using only one blower.

Second, a seatback duct mounted in a seatback and a seat cushion duct mounted in a seat cushion can be separated from each other at a folded position of the seatback in consideration of that a passenger does not sit when the seatback is folded, and accordingly, it is possible to reduce the weight and the manufacturing cost because it is not required to additionally mount a blower in a seatback beside a seat cushion like the related art.

Third, a blower is mounted only under a seat cushion far from the head of a passenger, whereby it is possible to reduce noise due to operation of the blower that a passenger actually senses.

As discussed, the method and system suitably include use of a controller or processor.

In another embodiment, vehicles are provided that comprise an apparatus as disclosed herein.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION OF THE DISCLOSURE

Figure 1A:
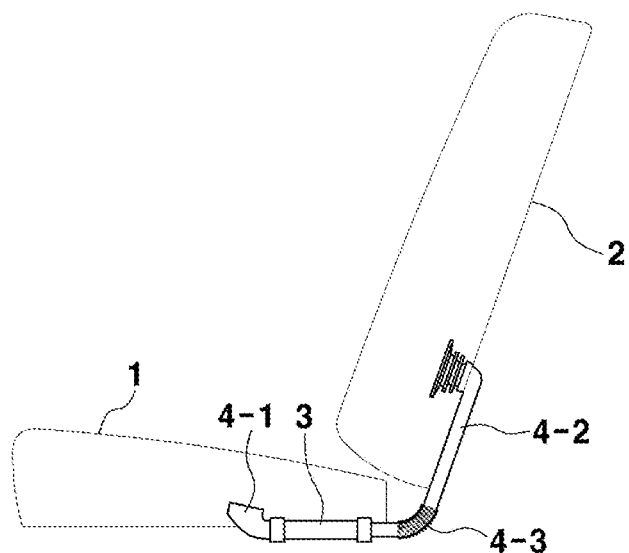
FIGS. 1A, 1, and 2 are schematic views showing a ventilation seat of the related art.
Figure 1B:
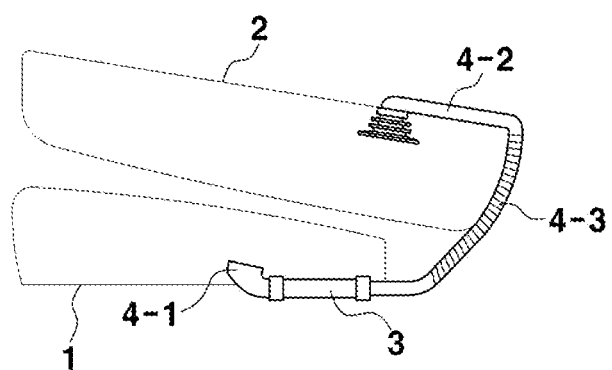
Figure 2:
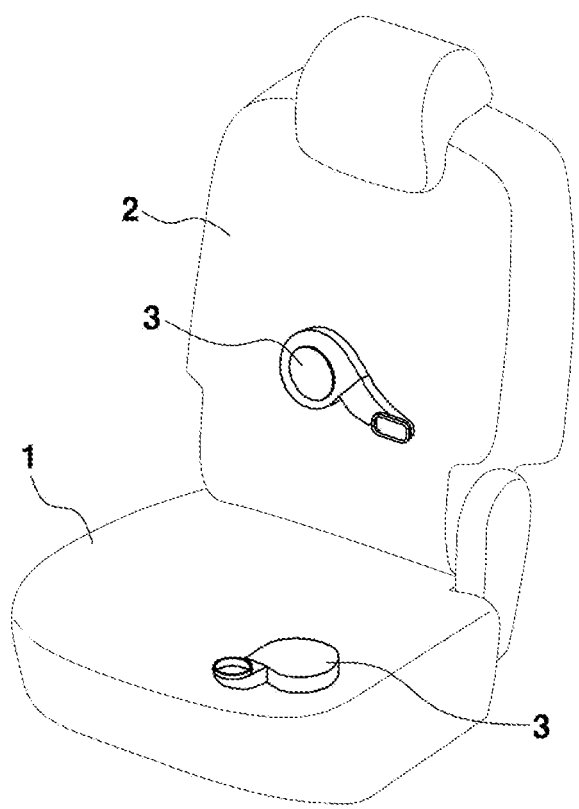

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings.

Figure 3:
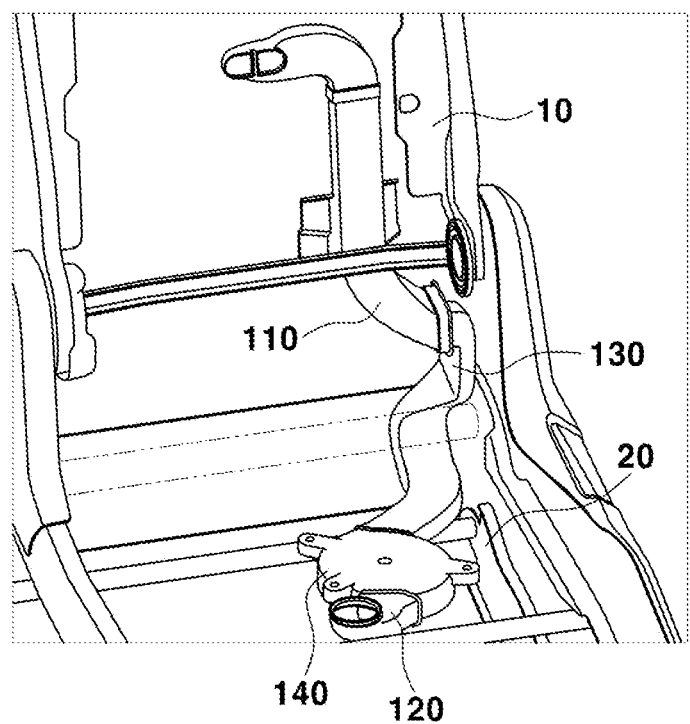
FIG. 3 is a perspective view showing a docked state of a duct docking device for a ventilation seat according to a first embodiment of the present disclosure.
Figure 4:
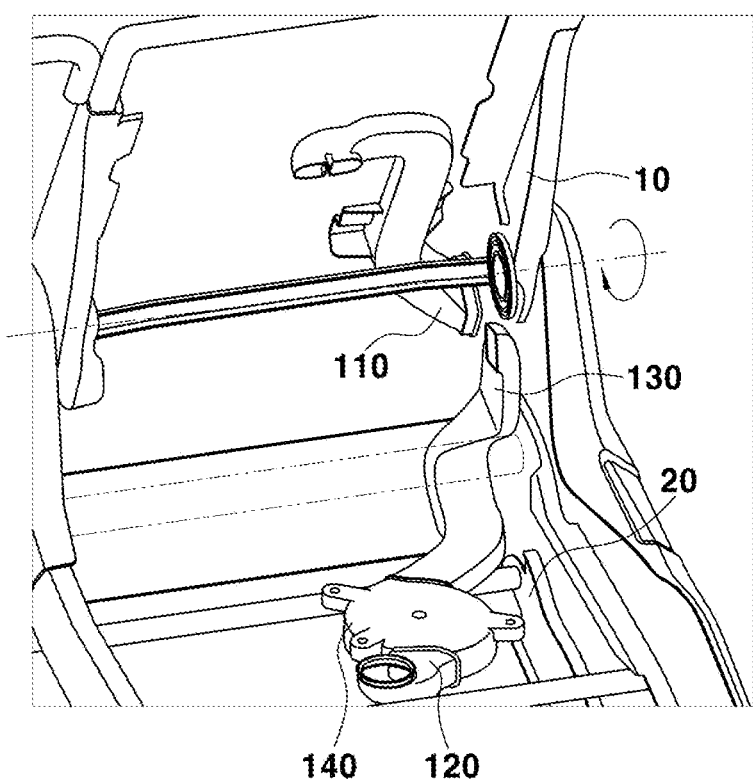
FIG. 4 is a perspective view showing a separated state of the duct docking device for a ventilation seat according to the first embodiment of the present disclosure.

In the accompanying drawings, FIG. 3 is a perspective view showing a docked state of a duct docking device for a ventilation seat according to a first embodiment of the present disclosure and FIG. 4 is a perspective view showing a separated state of the duct docking device for a ventilation seat according to the first embodiment of the present disclosure.

As shown in FIGS. 3 and 4, a seatback duct 110 may be mounted on a seatback frame 10 and a seat cushion duct 120 is mounted on a seat cushion frame 20.

The seatback duct 110 may be employed as an air channel for discharging air to the upper body of a passenger, and the seat cushion duct 120 may be employed as an air channel for discharging air to the lower body including the buttocks of a passenger.

A blower 140 that blows air to the seatback duct 110 and the seat cushion duct 120 may be mounted on the seat cushion frame 20.

In particular, the seat cushion duct 120 may be connected to a first discharge port of the blower 140, and a connector duct 130 disposed on the seat cushion frame 20 may be connected to a second discharge port of the blower 140.

An outlet of the connector duct 130 may be communicably docked to an inlet of the seatback duct 110 or may be separated from the inlet of the seatback duct 110, depending on the rotation position of the seatback frame 10.

As shown in FIG. 3, when the seatback is positioned at an unfolded position in which a passenger can sit, that is, the seatback frame 10 is at the unfolded position, the inlet that is the lower opening of the seatback duct 110 can be communicably docked to the outlet that is the upper opening of the connector duct 130.

Accordingly, when the blower 140 is driven, air that is discharged through the first discharge port of the blower 140 can be easily discharged to the lower body including the buttocks of a passenger through the seat cushion duct 120, and simultaneously, air that is discharged through the second discharge port of the blower 140 can be easily discharged to the upper body including the back of the passenger through the connector duct 130 and the seatback duct 110 docked to each other.

As shown in FIG. 4, when the seatback frame 10 is folded to a folded position, the seatback duct 110 may be also folded with the seatback frame 10, so the inlet that is the lower opening of the seatback duct 110 can be separated from the outlet that is the upper opening of the connector duct 130.

When the seatback frame 10 is positioned at the folded position, it is the state in which a passenger cannot sit and the ventilation seat is not used by a passenger, so it does not matter even though the inlet of the seatback duct 110 is separated from the outlet of the connector duct 130.

Figure 5:
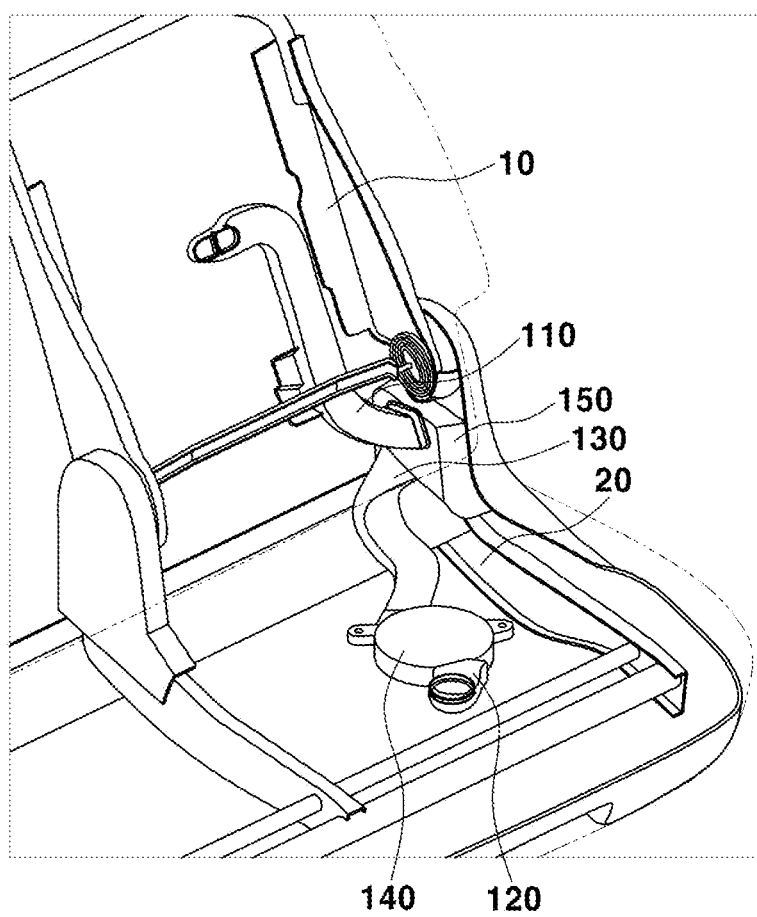
FIG. 5 is a perspective view showing the duct docking device for a ventilation seat according to the first embodiment of the present disclosure in which an inside cover is further mounted.
Figure 6:
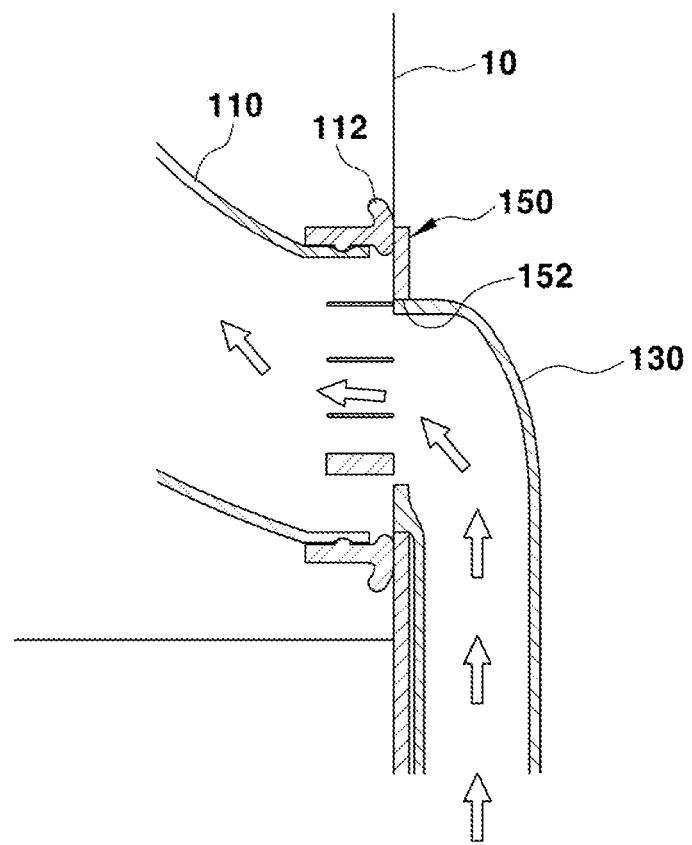
FIG. 6 is a cross-sectional view taken along line A-A shown in FIG. 5.

According to the first embodiment of the present disclosure, as shown in FIGS. 5 and 6, an inside cover 150 having a communicating hole 153 for communication between the seatback duct 110 and the connector duct 130 may be further mounted on a side of the seat cushion frame 20.

In this configuration, the outlet that is the upper opening of the connector duct 130 may be coupled to the communicating hole 152 from the outer surface of the inside cover 150, and the inlet of the seatback duct 110, may be in close contact with the inner surface of the inside cover 150 communicably with the communicating hole 152.

The inside cover 150 may be employed to maintain the communicating state between the seatback duct 110 and the connector duct 130 even though a passenger rotates forward or rearward the seatback frame 10 less than a predetermined angle from the unfolded position to change the sitting posture other than the unfolded position.

To this end, the area of the inlet that is the lower opening of the seatback duct 110 and is in close contact with the inner surface of the inside cover 150 may be smaller than the area of the inside cover 150 and larger than the area of the outlet that is the upper opening of the connector duct 130 and is coupled to the communicating hole 152.

Figure 8:
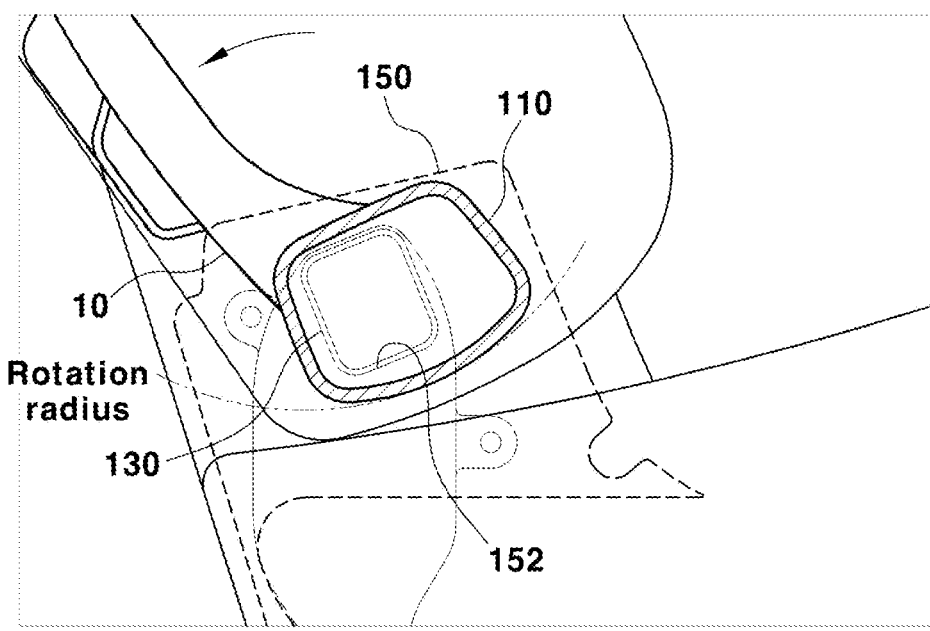

The size and shape of the inlet that is the lower opening of the seatback duct 110 and is in close contact with the inner surface of the inside cover 150 may depend on the rotation angle and the rotation radius of the seatback frame, and as shown in FIG. 8, the inlet of the seatback duct 110 may be rounded along the rotation radius.

Figure 7:
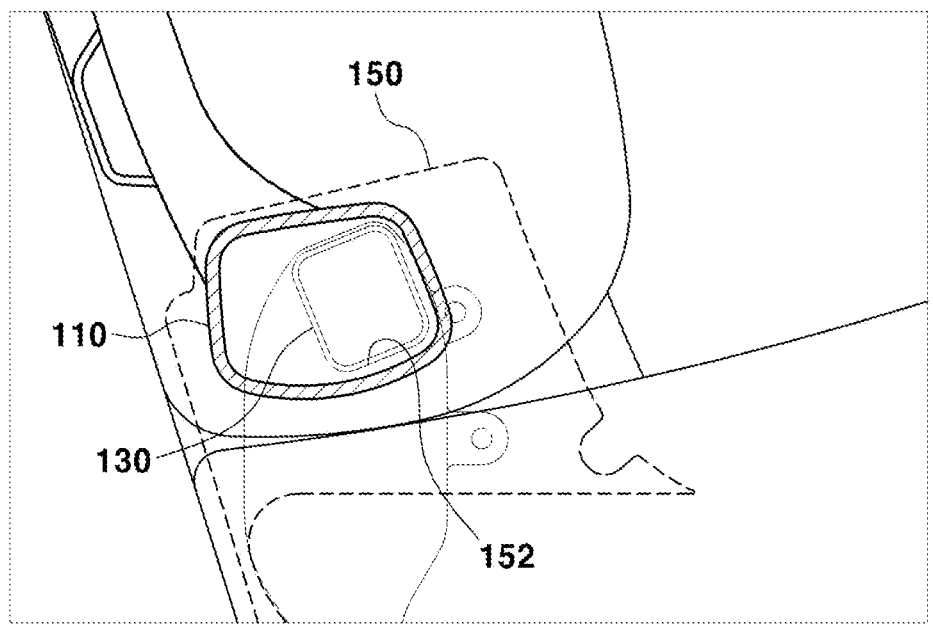
FIGS. 7 and 8 are lateral cross-sectional view showing a communicating-maintaining mechanism between the seatback duct and the connector duct when a seatback frame is rotated less than a predetermined angle in the duct docking device for a ventilation seat according to the first embodiment of the present disclosure.

Accordingly, when a passenger rotates forward the seatback frame 10 less than a predetermined angle to change the sitting posture, even though the seatback duct 110 is also rotated forward the same angle with the seatback frame 10, as shown in FIG. 7, the inlet of the seatback duct 110 can keep in hermetically close contact with the inner surface of the rear of the inside cover 150 and can keep communicating with the outlet of the connector duct 130 through the communicating hole 152.

On the other hand, when a passenger rotates rearward the seatback frame 10 less than a predetermined angle to change the sitting posture, even though the seatback duct 110 is also rotated rearward the same angle with the seatback frame 10, as shown in FIG. 8, the inlet of the seatback duct 110 can keep in hermetically close contact with the inner surface of the front of the inside cover 150 and can keep communicating with the outlet of the connector duct 130 through the communicating hole 152.

Meanwhile, a sealing plate 112 may be attached to the edge of the inlet that is the lower opening of the seatback duct 110 and is in hermetically close contact with the inner surface of the inside cover 150, whereby the air flowing from the connector duct 130 to the seatback duct 110 can be easily kept without leaking.

The operation flow of the duct docking device for a ventilation seat according to the first embodiment of the present disclosure described above is as follows.

When the seatback is positioned at an unfolded position in which a passenger can sit, that is, the seatback frame 10 may be at the unfolded position, the inlet that is the lower opening of the seatback duct 110 may be communicably docked to the outlet that is the upper opening of the connector duct 130 in close contact with the inner surface of the inside cover 150.

Accordingly, when the blower 140 is driven, air that is discharged through the first discharge port of the blower 140 can be easily discharged to the lower body including the buttocks of a passenger through the seat cushion duct 120, and simultaneously, air that is discharged through the second discharge port of the blower 140 can be easily discharged to the upper body including the back of the passenger through the connector duct 130 and the seatback duct 110 communicably docked to each other.

On the other hand, when the seatback frame 10 is folded to a folded position, the seatback duct 110 may be also folded with the seatback frame 10, so the inlet that is the lower opening of the seatback duct 110 comes out of the inside cover 150 and separates from the outlet that is the upper opening of the connector duct 130.

When the seatback frame 10 is positioned at the folded position, it is the state in which a passenger cannot sit and the ventilation seat is not used by a passenger, so it does not matter even though the inlet of the seatback duct 110 is separated from the outlet of the connector duct 130.

Meanwhile, when a passenger rotates forward the seatback frame 10 less than a predetermined angle to change the sitting posture, as shown in FIG. 7, the inlet of the seatback duct 110 may keep in hermetically close contact with the inner surface of the rear of the inside cover 150 without coming out of the inside cover 150, and simultaneously, keep communicating with the outlet of the connector duct 130 through the communicating hole 152, whereby the air that is discharged through the second discharge port of the blower 140 can be easily discharged to the upper body including the back of a passenger through the connector duct 130 and the seatback duct 110.

Even though a passenger rotates rearward the seatback frame 10 less than a predetermined angle to change the sitting posture, as shown in FIG. 8, the inlet of the seatback duct 110 may keep in hermetically close contact with the inner surface of the front of the inside cover 150 without coming out of the inside cover 150, and simultaneously, keep communicating with the outlet of the connector duct 130 through the communicating hole 152, whereby the air that is discharged through the second discharge port of the blower 140 can be easily discharged to the upper body including the back of a passenger through the connector duct 130 and the seatback duct 110.

According to the first embodiment of the present disclosure, the blower 140 may be mounted on the seat cushion frame far from the head of a passenger, it is possible to reduce noise due to operation of the blower that a passenger actually feels.

Figure 9:
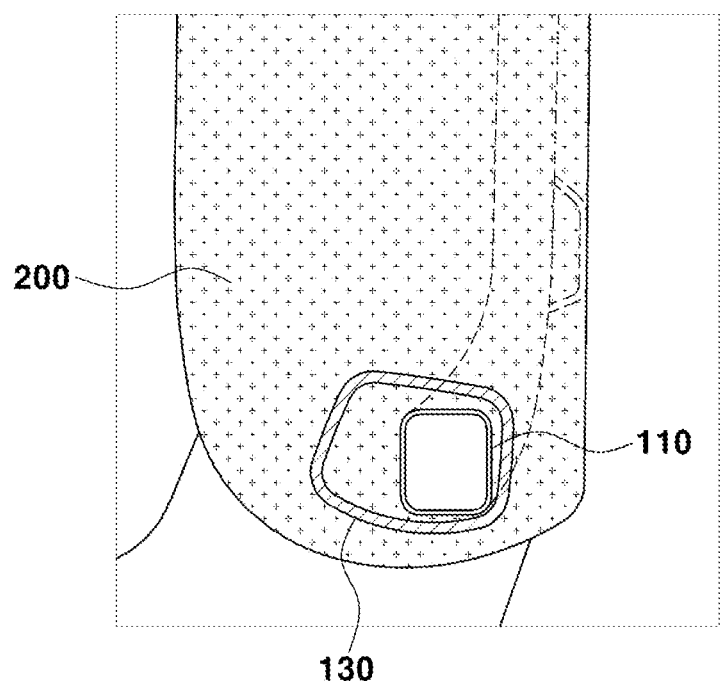
FIGS. 9 and 10 are lateral cross-sectional views showing a communicating-maintaining mechanism between the seatback duct and the connector duct when a seatback frame is rotated less than a predetermined angle in a duct docking device for a ventilation seat according to a second embodiment of the present disclosure.
Figure 10:
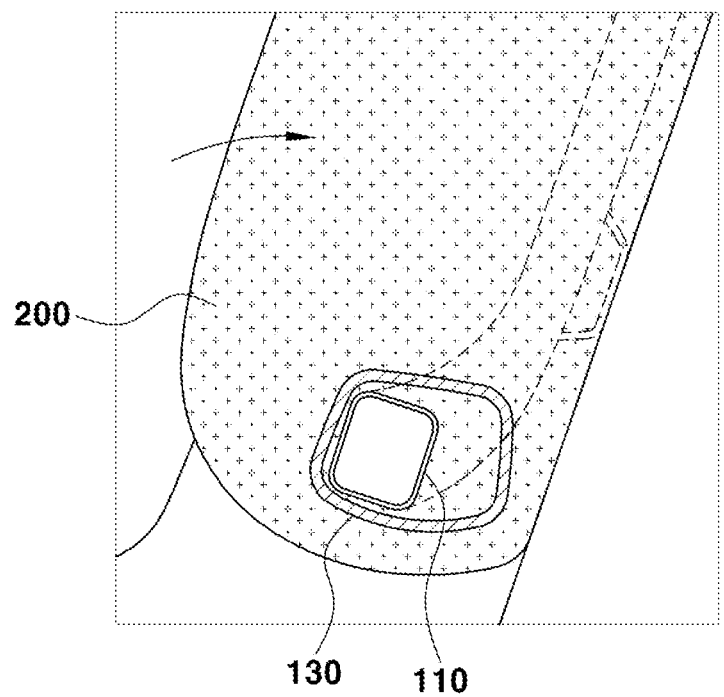

FIGS. 9 and 10 are lateral cross-sectional views showing a communicating-maintaining mechanism between the seatback duct and the connector duct when a seatback frame may be rotated less than a predetermined angle in a duct docking device for a ventilation seat according to a second embodiment of the present disclosure.

The second embodiment of the present disclosure is characterized in that the inside cover 150 of the components of the first embodiment described above is replaced with a seatback foam 200.

The duct docking device for a ventilation seat according to the present disclosure, as described with reference to FIGS. 3 and 4, may include a seatback duct 110 mounted on the seatback frame 10, a blower 140 mounted on the seat cushion frame 20, a seat cushion duct 120 mounted on the seat cushion frame 20 and connected to the first discharge port of the blower 140, and a connector duct 130 connected to the second discharge port of the blower 140.

In particular, a seatback foam 200 that is a cushion for the seatback is mounted on the seatback frame 10, and the inlet that is the lower opening of the seatback duct 110 may be disposed to make the same plane with a side of the seatback foam 200.

The lower end of the connector duct 130 may be connected to the second discharge port of the blower 140, and the upper end thereof may be in hermetically close contact with a side of the seatback foam 200.

That is, the outlet that is the upper opening of the connector duct 130 can be communicably docked to the inlet that is the lower opening of the seatback duct 110 in hermetically close contact with a side of the seatback foam 200 or may come out of the side of the seatback foam 200 and separate from the inlet that is the lower opening of the seatback duct 110, depending on the rotation position of the seatback frame 10.

To this end, the area of the outlet that is the upper opening of the connector duct 130 and is in close contact with the side of the seatback foam 200, as shown in FIGS. 9 and 10, may be smaller than the area of the side of the seatback foam 200 and larger than the area of the inlet that is the lower opening of the seatback duct 110.

The size and shape of the outlet of the connector duct 130 that is in close contact with the side of the seatback foam 200 may depend on the rotation angle and the rotation radius of the seatback frame and the outlet of the connector duct 130 may be rounded along the rotation radius.

The operation flow of the duct docking device for a ventilation seat according to the second embodiment of the present disclosure described above is as follows.

When the seatback is positioned at an unfolded position in which a passenger can sit, that is, the seatback frame 10 may be at the unfolded position, the outlet that is the upper opening of the connector duct 130 may be communicably docked to the inlet that is the lower opening of the seatback duct 110 in hermetically close contact with the side of the seatback foam 200.

Accordingly, when the blower 140 is driven, air that is discharged through the first discharge port of the blower 140 can be easily discharged to the lower body including the buttocks of a passenger through the seat cushion duct 120, and simultaneously, air that is discharged through the second discharge port of the blower 140 can be easily discharged to the upper body including the back of the passenger through the connector duct 130 and the seatback duct 110 communicably docked to each other.

On the other hand, when the seatback frame 10 is folded to the folded position, the seatback foam 200 and the seatback duct 110 may be also folded with the seatback frame 10, whereby the outlet that is the upper opening of the connector duct 130 comes out of the seatback foam 200 and separates from the inlet that is the lower opening of the seatback duct 110.

When the seatback frame 10 is positioned at the folded position, it may be the state in which a passenger cannot sit and the ventilation seat is not used by a passenger, so it does not matter even though the outlet of the connector duct 130 comes out of the seatback foam 200 and separates from the inlet of the seatback duct 110.

Meanwhile, when a passenger rotates forward the seatback frame 10 less than a predetermined angle to change the sitting posture, as shown in FIG. 9, the outlet of the connector duct 130 may keep in hermetically close contact with the side of the rear of the seatback foam 200 without separating from the side of the seatback foam 200 and keep communicating with the inlet of the seatback duct 110, whereby the air that is discharged from the second discharge port of the blower 140 can be easily discharged to the upper body including the back of a passenger through the connector duct 130 and the seatback duct 110.

Even though a passenger rotates rearward the seatback frame 10 less than a predetermined angle to change the sitting posture, as shown in FIG. 10, the outlet of the connector duct 130 may keep in hermetically close contact with the side of the front of the seatback foam 200 without separating from the side of the seatback foam 200 and keep communicating with the inlet of the seatback duct 110, whereby the air that is discharged from the second discharge port of the blower 140 can be easily discharged to the upper body including the back of a passenger through the connector duct 130 and the seatback duct 110.

Figure 11:
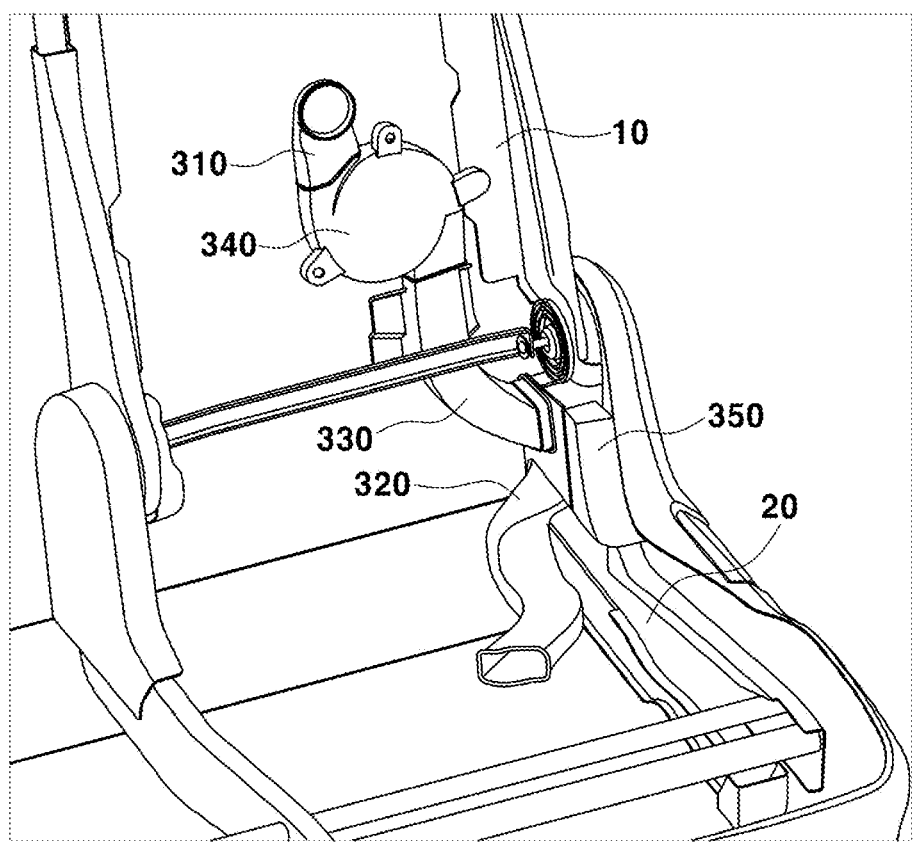
FIG. 11 is a perspective view showing a docked state of a duct docking device for a ventilation seat according to a third embodiment of the present disclosure.
Figure 12:
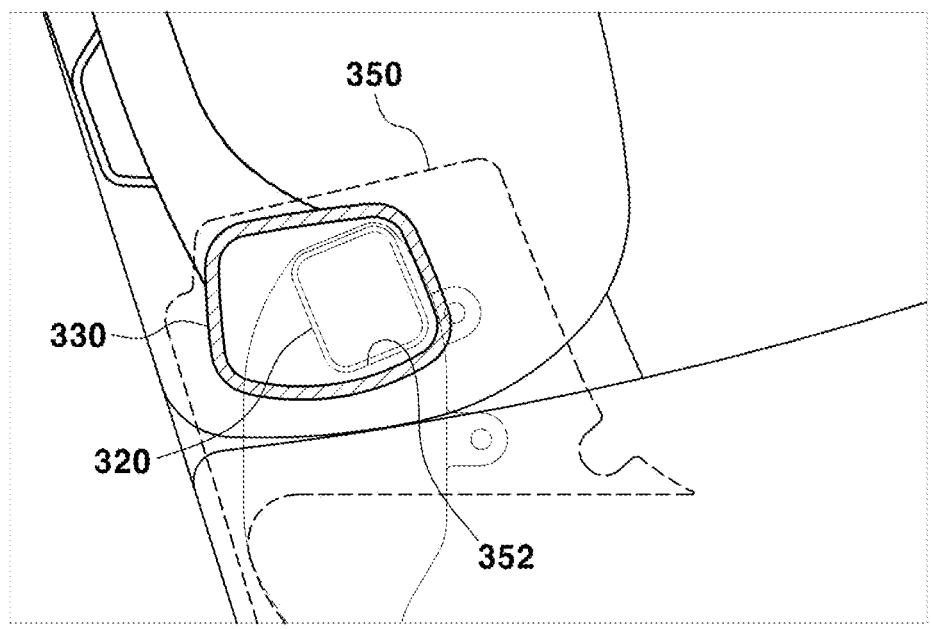
FIGS. 12 and 13 are lateral cross-sectional views showing a communicating-maintaining mechanism between the connector duct and the seat cushion duct when a seatback frame is rotated less than a predetermined angle in the duct docking device for a ventilation seat according to the third embodiment of the present disclosure.
Figure 13:
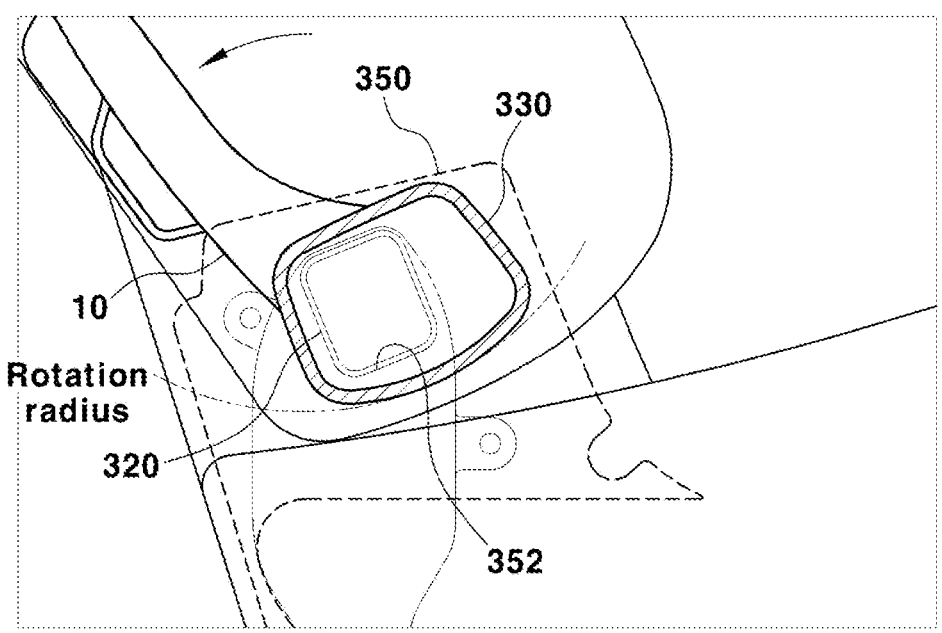
Figure 14:
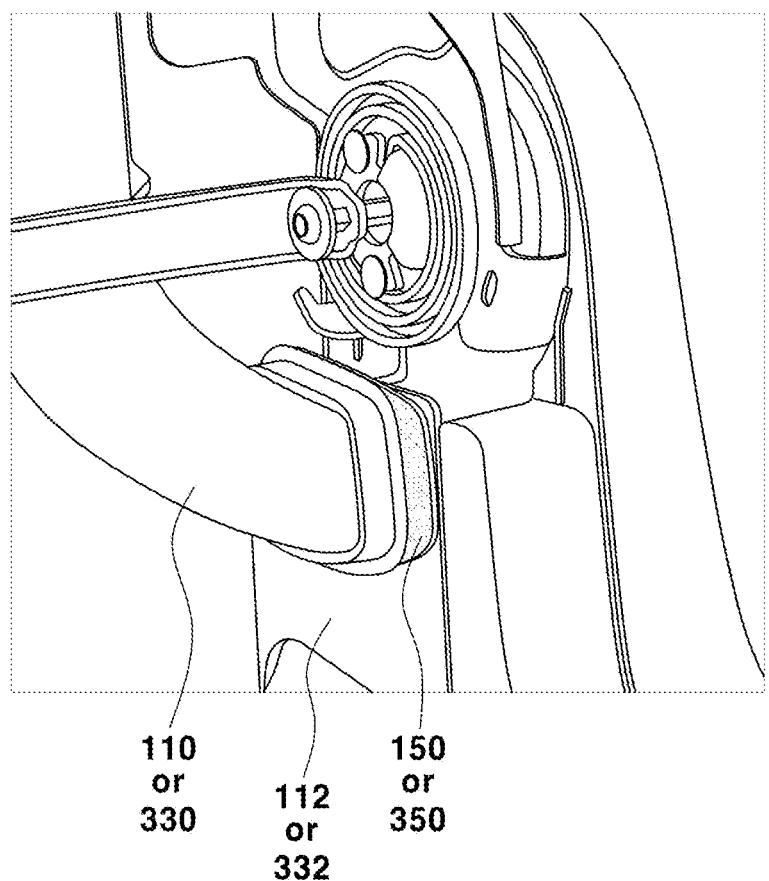
FIG. 14 is a partial enlarged view showing an example in which a hermetic sealing plate is attached to the seatback duct of the duct docking device for a ventilation seat according to the first embodiment of the present disclosure and is attached to the connector duct of the duct docking device for a ventilation seat according to the third embodiment of the present disclosure.

In the accompanying drawings, FIG. 11 is a perspective view showing a docked state of a duct docking device for a ventilation seat according to a third embodiment of the present disclosure and FIGS. 12 and 13 are lateral cross-sectional views showing a communicating-maintaining mechanism between the connector duct and the seat cushion duct when a seatback frame is rotated less than a predetermined angle in the duct docking device for a ventilation seat according to the third embodiment of the present disclosure.

As shown in FIG. 11, a seatback duct 310 may be mounted on a seatback frame 10 and a seat cushion duct 320 is mounted on a seat cushion frame 20.

The seatback duct 310 may be employed as an air channel for discharging air to the upper body of a passenger, and the seat cushion duct 320 may be employed as an air channel for discharging air to the lower body including the buttocks of a passenger.

A blower 340 that blows air to the seatback duct 310 and the seat cushion duct 320 may be mounted on the seatback frame 10.

In particular, the seatback duct 310 may be connected to a first discharge port of the blower 340, and a connector duct 330 mounted on the seatback frame 10 may be connected to a second discharge port of the blower 340.

An outlet that is a lower opening of the connector duct 330 may be communicably docked to an inlet that is an upper opening of the seat cushion duct 320 or may be separated from the inlet of the seat cushion duct 320, depending on the rotation position of the seatback frame 10.

For example, when the seatback frame 10 is at the unfolded position, the outlet that is the lower opening of the connector duct 330 can be communicably docked to the inlet that is the upper opening of the seat cushion duct 320, and when the seatback frame 10 is at the folded position, the outlet that is the lower opening of the connector duct 330 can be separated from the inlet that is the upper opening of the seat cushion duct 320.

According to the third embodiment of the present disclosure, as shown in FIG. 11, an inside cover 350 having a communicating hole 352 for communication between the connector duct 330 and the seat cushion duct 320 may be further mounted on a side of the seat cushion frame 20.

In this configuration, the inlet that is the upper opening of the seat cushion duct 320 may be coupled to the communicating hole 352 from the outer surface of the inside cover 350 and the outlet that is the lower opening of the connector duct 330 may be in close contact with the inner surface of the inside cover 350 communicably with the communicating hole 352.

The inside cover 350 may be employed to maintain the communicating state between the connector duct 330 and the seat cushion duct 320 even though a passenger rotates forward or rearward the seatback frame 10 less than a predetermined angle from the unfolded position to change the sitting posture other than the unfolded position.

To this end, the area of the outlet that is the lower opening of the connector duct 330 and is in close contact with the inner surface of the inside cover 350 may be smaller than the area of the inside cover 350 and larger than the area of the inlet that is the upper opening of the seat cushion duct 320 and is coupled to the communicating hole 352.

The size and shape of the outlet that is the lower opening of the connector duct 330 and is in close contact with the side of the inside cover 350 may depend on the rotation angle and the rotation radius of the seatback frame and the inlet of the connector duct 330 may be rounded along the rotation radius.

Meanwhile, a sealing plate 332 may be attached to the edge of the outlet that is the lower opening of the connector duct 330 and may be in hermetically close contact with the inner surface of the inside cover 350, whereby the air flowing from the connector duct 330 to the seat cushion duct 320 can be easily kept without leaking.

The operation flow of the duct docking device for a ventilation seat according to the third embodiment of the present disclosure described above is as follows.

When the seatback is positioned at an unfolded position in which a passenger can sit, that is, the seatback frame 10 may be at the unfolded position, the outlet that is the lower opening of the connector duct 330 may be communicably docked to the inlet that is the upper opening of the seat cushion duct 320 in close contact with the inner surface of the inside cover 350.

Accordingly, when the blower 340 is driven, air that is discharged through the first discharge port of the blower 340 can be easily discharged to the upper body including the back of a passenger through the seatback duct 310, and simultaneously, air that is discharged through the second discharge port of the blower 340 can be easily discharged to the lower body including the buttocks of the passenger through the connector duct 330 and the seat cushion duct 320 communicably docked to each other.

On the other hand, when the seatback frame 10 is folded to a folded position, the seatback duct 310 and the connector duct 330 may be also folded with the seatback frame 10, so the outlet that is the lower opening of the connector duct 330 comes out of the inside cover 350 and separates from the inlet that is the upper opening of the seat cushion duct 320.

When the seatback frame 10 is positioned at the folded position, it may be the state in which a passenger cannot sit and the ventilation seat is not used by a passenger, so it does not matter even though the outlet of the connector duct 330 is separated from the inlet of the seat cushion duct 320.

Meanwhile, when a passenger rotates forward the seatback frame 10 less than a predetermined angle to change the sitting posture, as shown in FIG. 12, the outlet of the connector duct 330 may keep in hermetically close contact with the inner surface of the rear of the inside cover 350 without coming out of the inside cover 350, and simultaneously, may keep communicating with the inlet of the seat cushion duct 320 through the communicating hole 352, whereby the air that is discharged through the second discharge port of the blower 340 can be easily discharged to the lower body including the buttocks of a passenger through the connector duct 330 and the seat cushion duct 320.

Even though a passenger rotates rearward the seatback frame 10 less than a predetermined angle to change the sitting posture, as shown in FIG. 13, the outlet of the connector duct 330 may keep in hermetically close contact with the inner surface of the front of the inside cover 350 without coming out of the inside cover 350, and simultaneously, may keep communicating with the inlet of the seat cushion duct 320 through the communicating hole 352, whereby the air that is discharged through the second discharge port of the blower 340 can be easily discharged to the lower body including the buttocks of a passenger through the connector duct 330 and the seat cushion duct 320.

As described above, since when a seatback is positioned at an unfolded position, etc. in which a passenger can sit, a seatback duct mounted at the seatback and a seat cushion duct mounted at the seat cushion are hermetically docked through a connector duct, etc., it is possible to easily blow air to the seatback and the seat cushion using only one blower and it is possible to reduce the weight and the manufacturing cost because it is not required to mount a blower in each of a seatback and a seat cushion like the related art.

Although the present disclosure was described above in detail through embodiments, the scope of the present disclosure is not limited to the embodiments, and various changes and modifications by those skilled in the art using the spirit of the present disclosure defined in the following claims are also included in the scope of the present disclosure.

What is claimed is:

1. A duct docking device for a ventilation seat of a vehicle, the duct docking device comprising:
   a seatback duct mounted on a seatback frame;
   a blower mounted on a seat cushion frame;
   a seat cushion duct mounted on the seat cushion frame and connected to a first discharge port of the blower; and
   a connector duct disposed on the seat cushion frame, connected to a second discharge port of the blower, and communicably docked to the seatback duct or separated from the seatback duct, depending on a rotation position of the seatback frame;
   wherein, when the seatback frame is at a folded position, an inlet of the seatback duct is separated from an outlet of the connector duct.

2. The duct docking device of claim 1, wherein when the seatback frame is at an unfolded position, an inlet of the seatback duct is communicably docked to an outlet of the connector duct.

3. The duct docking device of claim 1, wherein an inside cover having a communicating hole for communicating between the seatback duct and the connector duct when the seatback frame is positioned at a rotated position less than a predetermined angle other than an unfolded position is further mounted on the seat cushion frame.

4. The duct docking device of claim 3, wherein an outlet of the connector duct is coupled to the communicating hole from an outer surface of the inside cover, and an inlet of the seatback duct is in close contact with an inner surface of the inside cover communicably to the communicating hole.

5. The duct docking device of claim 4, wherein an area of the inlet of the seatback duct that is in close contact with the inner surface of the inside cover is smaller than an area of the inside cover and larger than an area of the outlet of the connector duct.

6. The duct docking device of claim 5, wherein a size and a shape of the inlet that is a lower opening of the seatback duct and is in close contact with the inner surface of the inside cover depend on a rotation angle and a rotation radius of the seatback frame and the inlet of the seatback duct is rounded along the rotation radius.

7. The duct docking device of claim 1, wherein a sealing plate configured to maintain a hermetic state is attached to an edge of an inlet of the seatback duct.

8. A vehicle comprising a duct docking device of claim 1.

9. A duct docking device for a ventilation seat of a vehicle, the duct docking device comprising:
   a seatback foam mounted on a seatback frame;
   a seatback duct mounted on the seatback frame and having an inlet disposed to make the same plane with a side of the seatback foam;
   a blower mounted on a seat cushion frame;
   a seat cushion duct mounted on the seat cushion frame and connected to a first discharge port of the blower; and
   a connector duct disposed on the seat cushion frame, connected to a second discharge port of the blower, and communicably docked to the seatback duct in close contact with the side of the seat foam or separated from the seatback duct, depending on a rotation position of the seatback frame.

10. The duct docking device of claim 9, wherein an area of an outlet of the connector duct that is in close contact with the side of the seatback foam is smaller than an area of the side of the seatback foam and larger than an area of an inlet of the seatback duct.

11. The duct docking device of claim 10, wherein a size and a shape of the outlet of the connector duct that is in close contact with the side of the seatback foam depend on a rotation angle and a rotation radius of the seatback frame and the outlet of the connector duct is rounded along the rotation radius.

12. A duct docking device for a ventilation seat of a vehicle, the duct docking device comprising:
   a seat cushion duct mounted on a seat cushion frame;
   a blower mounted on a seatback frame;
   a seatback duct mounted on the seatback frame and connected to a first discharge port of the blower; and a connector duct mounted on the seatback frame, connected to a second discharge port of the blower, and communicably docked to the seat cushion duct or separated from the seat cushion duct, depending on a rotation position of the seatback frame;

wherein, when the seatback frame is at a folded position, an outlet of the connector duct is separated from an inlet of the seat cushion duct.

13. The duct docking device of claim 12, wherein when the seatback frame is at an unfolded position, an outlet of the connector duct is communicably docked to an inlet of the seat cushion duct.

14. The duct docking device of claim 12, wherein an inside cover having a communicating hole for communicating between the connector duct and the seat cushion duct when the seatback frame is positioned at a rotated position less than a predetermined angle other than an unfolded position is further mounted on the seat cushion frame.

15. The duct docking device of claim 14, wherein an inlet of the seat cushion duct is coupled to the communicating hole from an outer surface of the inside cover, and an outlet of the connector duct is in close contact with an inner surface of the inside cover communicably to the communicating hole.

16. The duct docking device of claim 15, wherein an area of the outlet of the connector duct that is in close contact with the inner surface of the inside cover is smaller than an area of the inside cover and larger than an area of the inlet of the seat cushion duct.

17. The duct docking device of claim 16, wherein a size and a shape of the outlet that is a lower opening of the connector duct and is in close contact with the inner surface of the inside cover depend on a rotation angle and a rotation radius of the seatback frame and the outlet of the connector duct is rounded along the rotation radius.

18. The duct docking device of claim 12, wherein a sealing plate configured to maintain a hermetic state is attached to an edge of an outlet of the connector duct.

* * * * *